United States Patent [19]
Poludetkin et al.

[11] 3,875,701
[45] Apr. 8, 1975

[54] GEAR CUTTER HEAD GRINDER

[76] Inventors: Vladimir Romanovich Poludetkin, ulitsa 1 Smolenskaya 8, korpus 4, kv. 93; Iosif Donatovich Menitsky, ulitsa Pravdy 49, kv. 60, both of Vitebsk, U.S.S.R.

[22] Filed: Apr. 16, 1973

[21] Appl. No.: 351,765

[52] U.S. Cl. ............. 51/5 D; 51/165.79; 51/165.87; 51/288
[51] Int. Cl. ............................................ B24b 49/18
[58] Field of Search ............ 51/5 D, 165.79, 165.87, 51/165.77, 165.88, 225, 288

[56] References Cited
UNITED STATES PATENTS

| | | | |
|---|---|---|---|
| 1,032,686 | 7/1912 | Kundig | 51/165.87 X |
| 1,655,099 | 1/1928 | Hulse | 51/165.88 |
| 2,828,583 | 4/1958 | Carlsen | 51/288 X |
| 2,874,517 | 2/1959 | Märkle | 51/225 X |
| 3,634,977 | 1/1972 | Bunting | 51/165.87 |
| 3,640,024 | 2/1972 | Stahr | 51/165.87 |
| 3,641,714 | 2/1972 | Asano | 51/165.87 |
| 3,782,046 | 1/1974 | Schaap | 51/165.87 |

*Primary Examiner*—Donald G. Kelly
*Attorney, Agent, or Firm*—Waters, Roditi, Schwartz & Nissen

[57] ABSTRACT

A gear cutter head grinder is provided with cam operatively connected to carriage drive in order to synchronously interconnect a mechanism for compensating movement of a carriage and that of a tool head during compensating movements thereof, thereby making it possible to provide automatic grinding of the gear cutter head.

5 Claims, 6 Drawing Figures

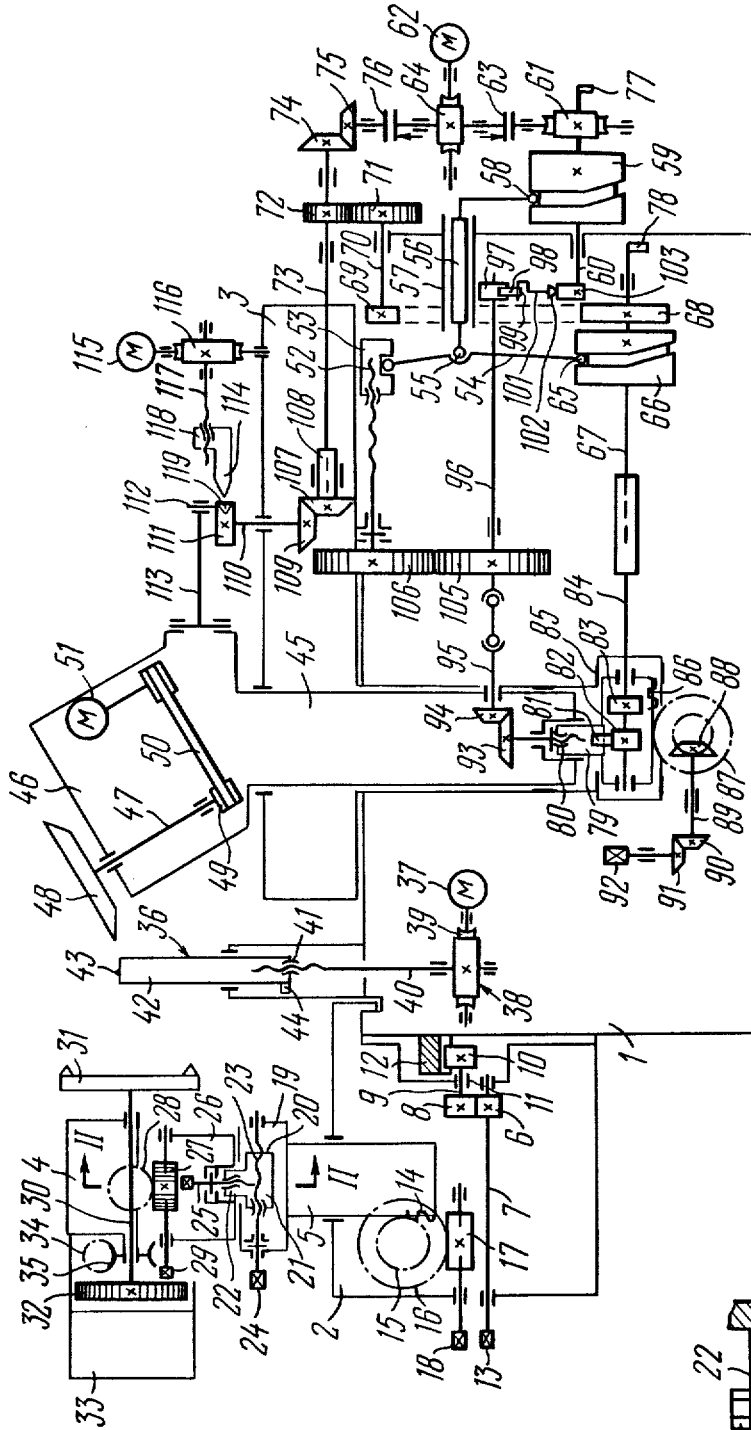
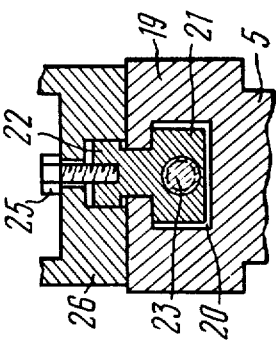
FIG.1
FIG.2

GEAR CUTTER HEAD GRINDER

This invention relates to cutter grinders and, more particularly, to gear cutter head grinders.

Cutter heads are used for cutting skew bevel gears. This invention may also be used for grinding circular broaches adapted to cut straight bevel gears.

Known in the art is a gear cutter head grinder comprising a bed, a carriage with a tool head and a support carrying a work head, a tool dressing unit being placed between the carriage and the support, said carriage having driving means operatively connected to a mechanism shifting the carriage in the course of the grinding operation, which, in turn, is connected to a mechanism shifting the carriage in the course of the tool dressing operation by means of a doublearm lever, to a mechanism of the reversible rotational movement of the tool head, and to a mechanism of vertical movement of the head during the grinding operation, the latter mechanism being connected to a mechanism of vertical movement of the tool head for tool wear compensation, and the mechanism shifting the carriage in the course of the tool dressing operation being operatively connected to a mechanism shifting the carriage during the tool wear compensation.

The conventional gear cutter head grinder is provided with cross guideways to guide the support, and with longitudinal guideways of the carriage and the tool head.

A vertically movable column is mounted on the support, said column having, at the upper portion thereof, a horizontally disposed table with guideways carrying a slide. There is a turntable on the slide with a work head mounted on this turntable. A spindle is accommodated in the work head with a gear cutter head to be ground attached to one end of the spindle and with a dividing disk to the other. The dividing disk is adapted to rotate the gear cutter head through an appropriate angle after the grinding of each tool of the cutter head, taking into account the fact that a gear cutter head has a plurality of circumferentially spaced tools.

The position of the gear cutter head should be adjusted with respect to the working tool of the grinder according to the size of the cutter head and the type of its tools. All setting movements of the gear cutter head are controlled manually and carried out by means of handles brought out to the control console of the grinder and operatively connected to associated mechanisms built-in the support of the grinder.

The carriage is mounted on the longitudinal guideways of the bed. A bushing carrying the tool head is accommodated on the carriage. A working tool of the grinder has the shape of a truncated cone and is made of abrasive material, the generatrix of the cone comprising the cutting edge.

The working tool dressing mechanism is mounted on the bed between the support and the carriage. This mechanism comprises a vertically oriented diamond movable in the vertical direction.

During the tool dressing operation the point of the diamond is aligned with the cutting edge of the tool.

The dressing is repeated before every grinding operation of the gear cutter head, in so far as the cutting edge of the tool getting dull in the course of the grinding operation, i.e., the removed metal particles clog the spaces between the points of abrasive particles of the tool.

To remove the dull layer of the tool the tool head is to be vertically shifted.

This movement is carried out by means of a mechanism comprising an oil cylinder, the piston rod of which is connected to a pawl of a ratchet gear mounted on the bed. A ratchet wheel of this gear is fixed to a shaft rigidly connected to a bevel gear engaging another bevel gear which is keyed to the end of the screw comprising a support for the bushing carrying the tool head. The nut of this screw is rigidly fixed in the bushing, thereby ensuring vertical movement of the bushing during the rotation of the screw.

After removing the dull layer from the cutting edge of the tool the position of the tool point defined by the base and the generatrix of the truncated cone is changed. The point of the cutting edge is moved away from the diamond point. To restore the relative position of the cutting edge point, it is necessary to impart movement to the carriage along with the tool head. This movement is effected by means of a mechanism comprising an oil cylinder with a nut attached to the body of the cylinder, said nut engaging a screw mounted on the carriage. The mechanism compensating movement of the carriage is controlled manually by means of a handle brought out to the control console of the grinder and operatively connected to said screw by a tooth gear.

In this manner there is no interconnection in the conventional cutter head grinders between the mechanisms compensating movements in two directions. This situation brings about periodical interventions of the operator in the work of the gear cutter head grinder which is one of disadvantages inherent in conventional grinders.

Movements of the carriage with the tool head to the cutter head grinding zone and back therefrom after every tool grinding operation are accomplished by means of the mechanism for shifting the carriage in the course of grinding. This mechanism comprises a shaft connected to driving means and carrying a cam with a profile groove on a side thereof. A roller is placed in the groove, said roller being attached to an end of a double-arm lever. A pivoting bearing of the lever is fixed, the other end of the lever is connected to a piston stem of an oil cylinder comprising the mechanism shifting the carriage in the course of the tool dressing and tool wear compensation. A nut attached to the oil cylinder engages a screw mounted on the carriage and adapted to move it.

During the grinding of the gear cutter head the tool head executes reversible rotatable movements imparted thereto by a crank gear mechanism mounted on the carriage. However, during the tool dressing operation the cutting edge of the tool should be maintained in line with the diamond point. To stop the reversible rotational movements of the head at this movement, the gear cutter head grinder is provided with a stop preventing rotation of the crank gear mechanism. The stop is connected to a stem of an oil cylinder adapted to control the operation of the former.

The vertical movement of the diamond is also effected by means of an oil cylinder.

Thus, the conventional grinder comprises a number of separate mechanisms disconnected with respect to each other and adapted to perform different movements of the carriage and of the tool head in the course of grinding and dressing operations, respectively. Individual driving means are provided for carrying out each movement. In most cases such driving means comprise an oil cylinder. To this end, the structure of the gear cutter head grinder is complicated by use of plurality of pipelines, while the existance of the individual driving means makes it impossible to fully automatic the process of grinding the gear cutter head, thereby constantly necessitating operator's control. This is still another disadvantage of the grinder of the conventional structure.

An object of the present invention is to eliminate disadvantages mentioned above and to provide a gear cutter head grinder of the structure that would make it possible to fully automate the grinding operation, thereby improving the operating conditions and performance of the grinder.

This and other objects are attained in a gear cutter head grinder comprising a bed supporting a carriage with a tool head and a support carrying a work head, a tool dressing unit being located between the carriage and the support, said carriage having driving means operatively connected to a mechanism shifting the carriage in the course of grinding operation, which, in turn, is connected to a mechanism shifting the carriage in the course of the tool dressing operation by means of a double-arm lever, to a mechanism of reversible rotational movement of the tool head, and to a mechanism of vertical movement of the head during the grinding operation, the latter mechanism being connected to a mechanism of vertical movement of the tool head for tool wear compensation, and the mechanism shifting the carriage in the course of the tool dressing operation being operatively connected to a mechanism shifting the carriage during the tool wear compensation.

According to the invention, the mechanism compensating movement of the carriage is in a direct communication with the double-arm lever, the pivot of which is movable and connected to the carriage driving means by a cam mechanism, said mechanism compensating movement being also operatively connected to the mechanism for vertical compensating movement of the tool head in order to synchronize said compensating movements.

It is expedient to provide the cam mechanism with a shaft interconnected with driving means and carrying a cam rigidly fixed thereon, a groove being made on a side of the cam accommodating one end of a carrier, the other end of which serves as a pivot bearing for the double-arm lever.

This arrangement of the cam mechanism and its interconnection with the driving means make it possible to fully automate the process of grinding the gear cutter head.

According to one of the embodiments of the invention, a second cam is fixed to the cam mechanism shaft, said cam engaging the mechanism for vertical movement of the tool head during the wear compensation of the tool.

According to another embodiment of the invention, the operative interconnection of the mechanism for vertical movement of the tool head and that for the tool wear compensation is effected by means of two engaging tooth gears.

This arrangement makes it possible to synchronize all compensating movements and to obviate operator's intervention when reestablishing the relative position of the cutting edge after accomplishing the tool dressing operation.

The invention will now be explained in greater detail with reference to embodiments thereof which are represented in the accompanying drawing, wherein:

FIG. 1 is a diagram of a gear cutter head grinder made in accordance with the invention;

FIG. 2 is a sectional view taken along the lines II—II of FIG. 1;

Figure 3:
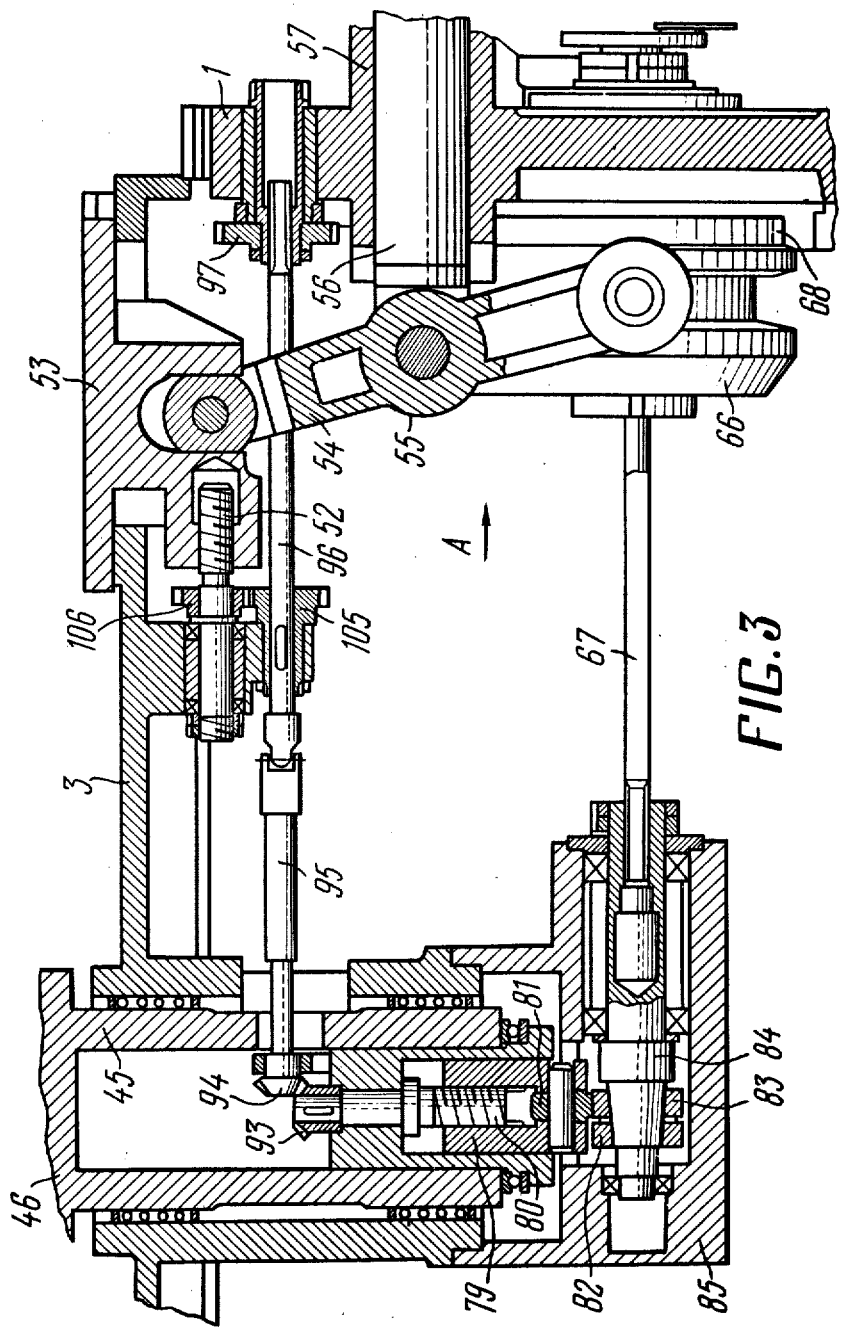
FIG. 3 is a view of mechanism compensating movements of the carriage and the tool head.

A gear cutter head grinder has a horizontally disposed bed 1 (FIG. 1) with cross guideways for guiding a support 2 and longitudinal guideways for a carriage 3 made on the bed 1. The support 2 is a base for a work head 4 mounted thereon. In so far as the grinder is adapted for grinding gear cutter heads of different types and sizes, it is possible to shift and to rotate the work head both in horizontal and vertical planes. The following means are provided to accomplish these movements. A vertically movable column 5 is mounted on the support 2. The support 2 is connected to a tooth gear 6 fixed on a shaft 7 journaled in the support body. This gear 6 engages a tooth gear 8 attached to a shaft 9 along with a gear 10.

A bearing 11 for the shaft 9 is also accommodated in the support body. The gear 10 is in mesh with a tooth rack 12 rigidly fixed to the bed 1. The shaft 7 terminates in a handle 13 extending beyond the limits of the support 2 and is adapted to control movements of the support along the cross guideways of the bed 1.

A vertically oriented rack 14 is rigidly attached to the sidewall surface of the column, said rack engaging a flywheel 15. A worm wheel 16 is keyed to the shaft of the flywheel, said worm wheel being meshed with a worm 17. The worm 17 is journalled in the support body. The worm 17 terminates in a handle 18 brought out of the support 2, and is adapted to control the vertical movement of the column 5.

The upper (according to the drawing) portion of the column 5 terminates in a horizontally oriented table 19 (FIG. 2) provided with a through groove 20 adapter to accommodate a nut 21 therein. The nut 22 has a cylindrical head 22 projecting above the surface of the table 19 and intended to support the work head 4. A threaded opening parallel to the base of the groove is made in the body of the nut 21, said opening engaging a screw 23 threaded therein. Bearings of the screw 23 are located in the table 19 of the column 5. This screw also terminates in a handle 24 brought out of the support 2 and is adapted to control movements of the work head 4 in the horizontal plane in the direction normal to the cross guideways of the bed 1.

A threaded opening for a screw 25 is provided in the cylindrical head 22 of the nut 21, said opening having direction normal to the axis of the screw 23 and laying at the same plane therewith.

The work head 4 has a supporting member 26 which is also provided with an opening for the screw 25 which thereby interconnects the work head 4 and the column 5. The supporting member 26 of the work head 4 is made rotatable with respect to the head 22 of the nut 21. To adjust the rotation of this member, it is necessary to loosen the screw 25, to set the supporting member 26 in a required position and then to secure it on the table 19 of the column by tightening the screw 25.

A worm 27 is mounted in the supporting member 26 of the work head 4, said worm being in mesh with a worm wheel sector 28 accommodated in the work head 4. The worm 27 terminates in a handle 29 brought out of the supporting member 26 and is adapted to control the rotation of the work head 4 in the vertical plane.

The work head 4 accommodates a spindle 30 with gear cutter head 31 to be ground attached to one end of the spindle and with a changeable dividing disk 32 attached to the other end thereof, said disk having circumferentially spaced openings the number of which is equal to or divisible by the number of tools in gear cutter head 31.

The work head 4 is equipped with a cylindrical journal adapted to mount a divising mechanism 33 which controls the rotation of the dividing disk 32. To align the spindle 30 and the dividing disk 32 with respect to the dividing mechanism 33, a worm wheel sector 34 is mounted on the cylindrical journal of the work head 4, said sector engaging a worm 35 which is mounted in connection with the dividing mechanism 33.

A working tool dressing mechanism is positioned on the bed 1 between the support 2 and the carriage 3. This mechanism is provided with self-contained driving means comprising an electric motor 37 with a worm reducer 38 mounted on the bed 1. The shaft of the worm wheel 39 of the reducer 38 is vertically oriented and is made integrally with a lead screw 40 engaging a nut 41 formed in the lower (according to the drawing) portion of a bushing 42 of the mechanism 36. A dressing diamond 43 is fixed to the upper (according to the drawing) end face of the bushing 42. A limit switch 44 is mounted on the lower end face of the bushing 42, said limit switch adapted to turn off the motor 37 after completing the dressing operation.

The carriage 3 rests upon the longitudinal guideways of the bed 1. A vertical opening is provided in the carriage to locate a sleeve 45 therein, said sleeve carrying a tool head 46 rigidly fixed to this sleeve. The tool head 46 accommodates a spindle 47 with a working tool fixed to one end thereof and with a pulley 49 attached to the other, said working tool comprising a grinding wheel in the form of a truncated cone. By means of a driving belt 50 the sleeve 49 is connected to an electric motor 51 comprising driving means for the grinding wheel 48.

The carriage 3 is moved along the guideways in the course of dressing of the grinding wheel 48; during the shifting thereof into the zone of grinding of the gear cutter head 31 and during its return stroke into the original position, as well as for shifting the carriage for compensating the wear of the grinding wheel 48 after grinding one of the gear cutter heads 31 has been completed. Taking into account the fact that each of the operations mentioned above differs from the other both in speed and amount of shifting, different mechanisms are provided for driving the carriage 3 in these movements.

Figure 4:
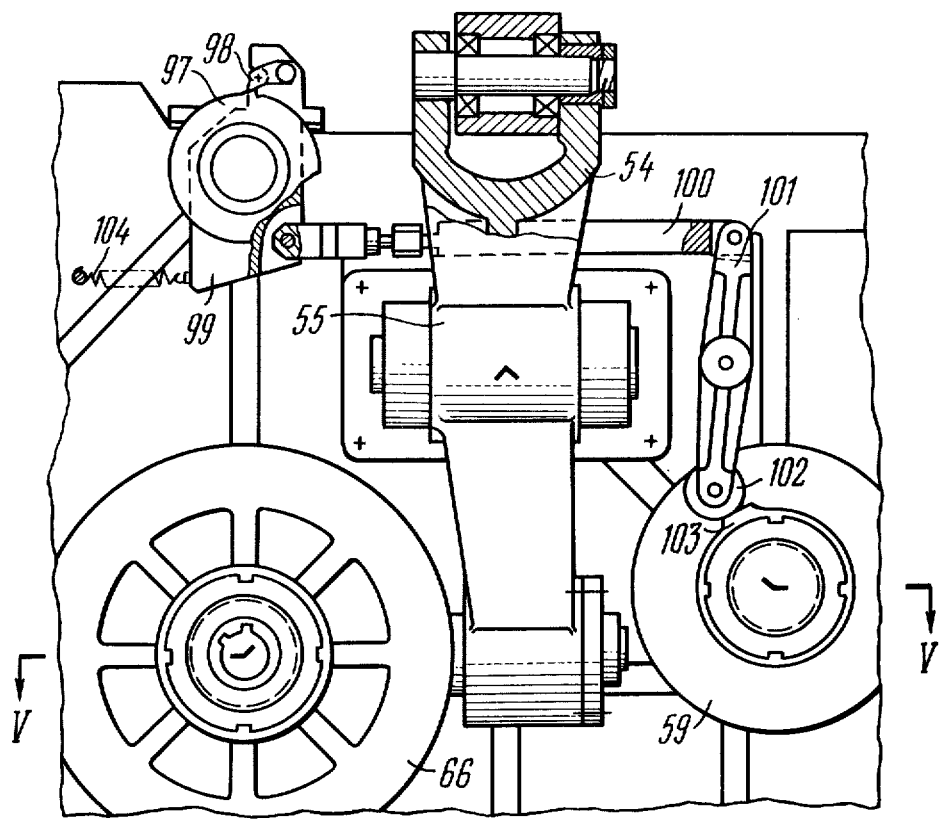
FIG. 4 is a view taken along arrow A in FIG. 3.
Figure 5:
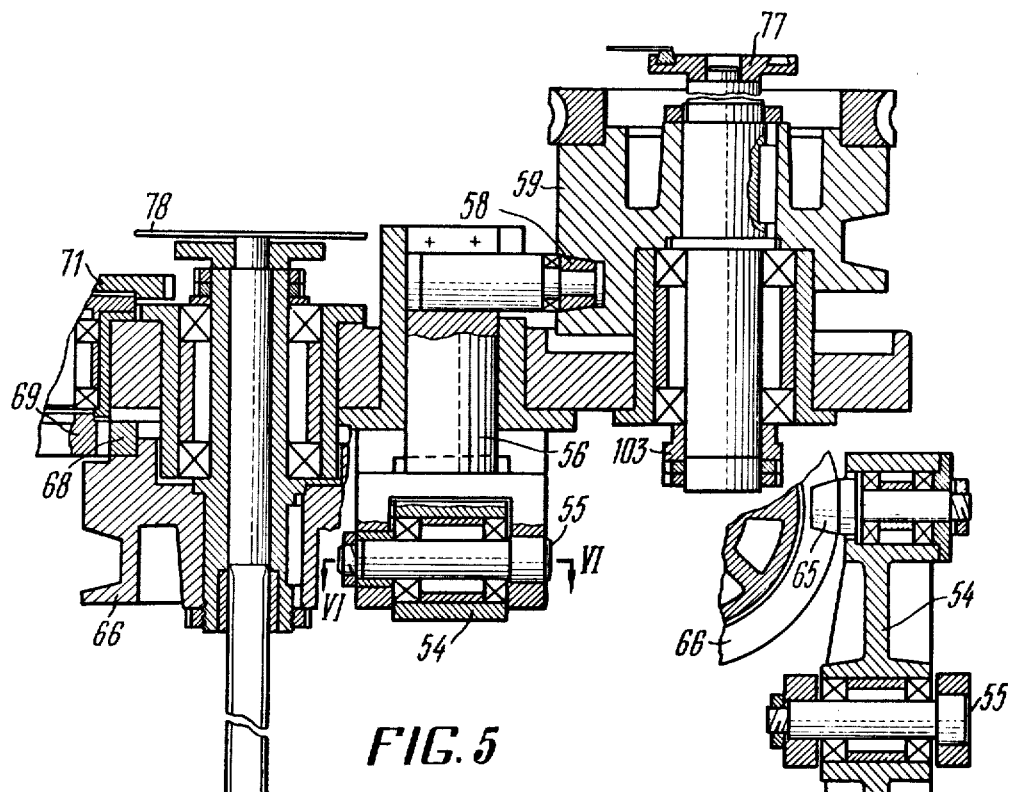
FIG. 5 is a sectional view taken along lines V—V of FIG. 4.

A lead screw 52 (FIG. 3) adapted to move the carriage 3 along the guideways of the bed 1 is mounted on the bed, said screw engaging a nut 53. During the dressing of the grinding wheel 48 the nut 53 is connected to an end of a double-arm lever 54 (FIG. 4) a bearing of which, according to the invention, is made movable. An end of a carrier 56 (FIG. 5) serves as the bearing 55 for the lever 54, said carrier moving in guides 57 made in the bed 1. The other end of the carrier 56 terminates in a roller 58 engaging a cam 59 provided with a profile groove on a sidewall thereof, said profile controlling movements of the carrier 56. The cam 59 is fixed on a shaft 60 connected to a shaft of a worm reducer 61, in turn, is connected to an electric motor 62 through an electromagnetic clutch 63 and a reducer 64. The electric motor 62 along with a reducer 64 comprise driving means for the carriage and are mounted on the bed 1.

Figure 6:
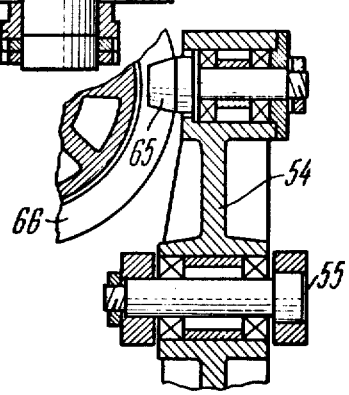
FIG. 6 is a sectional view taken along lines VI—VI of FIG. 5.

To move the grinding wheel 48 into the zone of grinding the gear cutter head 31, the nut 53 is also connected to an end of the double-lever 54, an end of the carrier 56 comprising the bearing 55 for the lever. The other end of the lever 54 terminates in a roller 65 (FIG. 6) engaging a cam 66 having a profile groove on the sidewall thereof which determines the mode of movement for the end of the lever 54. The cam 66 is keyed to a shaft 67 mounted on the bed 1.

A tooth gear 68 engaging a tooth gear 69 fixed on the same shaft 70 with a gear 71 is attached to the shaft 67. A bearing of the shaft 70 is mounted on the bed 1. The tooth gear 71, in turn, engages the gear 72 attached to a shaft 73 along with a bevel gear 74. Bearings of the shaft 73 are also accommodated in the bed 1. The bevel gear 74 is in mesh with another bevel gear 75. The shaft of the gear 75 is connected to the reducer 64 of the carriage driving means through an electromagnetic clutch 76.

Limit switches 77 and 78 are mounted at the ends of the shafts 60 and 67 respectively, said limit switches being adapted to de-energize the respective electromagnetic clutches after completing the operations of dressing the grinding wheel 48 and shifting it into the zone of grinding the gear cutter head 31, respectively.

During the grinding of each tool of the gear cutter head 31 the tool head 46 is lowering removing a metal layer off the cutter surface to be ground. To accomplish the vertical shifting of the sleeve 45 along with the tool head 46, a nut 79 rigidly fixed to the sleeve is provided in the lower portion thereof, said nut engaging a lead screw 80 comprising a support for the sleeve 45. A roller 81 with a horizontal axle is mounted at the lower (according to the drawing) end of the screw 80. The roller 81 rests upon one of master cams 82 and 83. These master cams 82 and 83 are in series fixed on the same shaft 84 journalled in the carriage 3. A shaft 84 is splined to the shaft 67 of the mechanism for shifting the carriage 3 during the movement of the gear cutter head 31 into the working zone. Each of the master cams 82 and 83 comprises a cylinder which is mounted eccentrically on the shaft 84. The amount of the eccentrically determines the speed of shifting the sleeve 45 along with the tool head 46 and hence the depth of the metal removed by the grinding wheel 48 from the surface to be ground. Therefore, one of the master cams 82 is adapted to be used during the course grinding while the other (83) is used for fine grinding the surface of tools of the gear cutter head 31. To switch the master cams from one mode of operation to the other, a body 85 is provided accommodating these master cams. A rack 86 is attached to a side-wall of the body 85, this rack being in mesh with a bevel gear 87. The gear 87 engages a tooth gear 88 mounted on the same shaft 89 with a bevel gear 90 which, in turn, engages a tooth gear 91, the shaft of this gear terminating in a handle 92 brought out of the carriage 3 and being adapted to control the switching of the master cams 82 and 83.

To compensate the wear of the grinding wheel 48 after every grinding operation of the gear cutter head 31, a mechanism for vertical shifting of the sleeve 45 is provided, said mechanism including a bevel gear 93 attached to the upper (according to the drawing) end of the screw 80. The bevel gear 93 is in mesh with another bevel gear 94 mounted on a shaft 95 journaled in the sleeve 45. The shaft 95 is pivotally connected to a shaft 96 placed in the carriage 3. A ratchet wheel 97 fixed to the bed 1 is mounted on the end of the shaft 96. Upon shifting the carriage 3 the shaft 96 is adapted to be moved in the opening of the ratched wheel 97. The ratchet wheel 97 engages a pawl 98 made integrally with a cheek 99. The cheek 99 by means of a rod 100 is movably connected to a lever 101 with a roller 102 mounted at an end of the lever, said roller engaging the surface of a cam 103 fixed on the shaft 60. A spring 104 is adapted to return the cheek 99 along with the pawl 98 to the original position after rotation of the ratchet wheel 97. According to the invention, for shifting the carriage 3 simultaneously with the sleeve 45 during the gridning wheel wear compensation a tooth gear 105 is mounted on the shaft 96, said gear engaging a tooth gear 106 fixed at the end of the lead screw 52 of the carriage 3.

In the course of grinding of the gear cutter head the sleeve 45 along with the grinding wheel head 46 execute reversible rotational movements in the horizontal plane. To this end a special mechanism is provided comprising a tooth gear 107 mounted on a shaft 108 journaled in the carriage 3 and connected by a splined joint to the shaft 73 of the mechanism adapted to shift the carriage 3 upon movement of the grinding wheel 48 into the working zone. The gear 107 is in mesh with a bevel gear 109 mounted on a shaft 110 journaled in a carriage 3. A tooth gear 111 with a crank 112 disposed in parallel with the rotational axis thereof is mounted on the same shaft 110.

The crank is movably connected to an end of a connecting rod 113 the other end of which is pivoted to the sleeve 45 with the grinding wheel head 46.

A stop 114 is provided to prevent rotation of the sleeve 45 during dressing the grinding wheel 48. The stop 114 may be moved by means of a drive mechanism comprising an electric motor 115 connected to a worm reducer 116. The electric motor 115 along with the reducer 116 are mounted on the carriage 3. A lead screw 117 is made integrally with the shaft of the worm wheel of the reducer 118, the nut of this screw being made intagrally with the stop 114. A recess 119 is provided on an end face of the tooth gear 111 to locate the end of the stop 114 therein during the dressing of the grinding wheel 48.

Thus, the operative interconnection between the mechanism for compensating movement of the carriage and that of the tool head 46 ensures maintaining the constant position of the cutting edge of the grinding wheel 48 with respect to the dressing diamond 73 and the gear cutter head, thereby eliminating the need for periodical adjustments of the gear cutter head grinder.

Furthermore, the operative interconnection between the mechanism for shifting the carriage 3 during the dressing operation and that for compensating movement thereof as well as their interconnection with driving means make it possible to eliminate hydraulic drive means from the structure of the gear cutter head grinder, thereby making this structure more simple.

The gear cutter head grinder operates as follows. In the original position before the beginning of the operation the carriage 3 is in extreme right position, the mechanism 36 for dressing the grinding wheel 48 are elevated so that the dressing diamond 43 is in a line with the cutting edge of the tool, while the end of the stop 114 is inserted into the recess 119 provided in the tooth gear 111.

The gear cutter head 31 to be ground is fixed to the end of the spindle 30 of the work head 4. Thereafter the setting movement of the support 2 along the guidways of the bed 1, the vertical shifting of the column 5 with respect to the support 2, and the movement of the supporting member 26 mounted on the cylindrical head 22 of the nut 21 by moving the nut 21 along the groove 20 of the table 19 in the upper portion of the column are accomplished. All these movements are carried out by hand through the handles 13, 18 and 24. The amounts of shifting depends on the diameter of the gear cutter head 31 to be ground as well as on the profile and the length of the tools thereof. Then upon loosening the screw 25 the supporting member 26 is rotated in the horizontal plane, along with the work head 4. This movement depends on the type of teeth to be formed by the gear cutter head 31. The next operation is the tilting of the spindle 30 of the work head 4 in the vertical plane which is accomplished by means of the handle 29 with regard to the diameter of the gear cutter head 31 and the profile of the tools thereof. All setting movements mentioned above are no different from those made on conventional gear cutter head grinders.

Following these the dividing mechanism 33 is adjusted taking into account the number of tools in the gear cutter head 31, then the electric motor 51 of the tool head 46 is switched on. From this motor the rotation is transmitted to the spindle 47 with the grinding wheel 48 through the belt drive 50. Thereafter the electric motor 62 of the carriage drive and the electromagnetic clutch 63 are switched on. The rotation is transmitted to the shaft 60 carrying the cams 59 and 103 through the reducer 61. The groove of the cam 59 comprises alternative portions normal to the rotational axis thereof and inclined thereto. At the moment of switching on the electric motor 62 the end of the carrier 56 with the roller 58 is at the initial point of the portion normal to the axis, therefore the carrier 56 does not move along the guideways 57 and the bearing 55 of the lever 54 is motionless. At the same moment the roller 102 begins to roll over the projection made on the surface of the cam 103. As a result, the lever 101 shifts the cheek 99 to the right by means of the rod 100 connected thereto. As this takes place, the pawl rotates the ratchet wheel 97.

During the rotation the ratchet wheel 97 drives the shaft 96 with the tooth gear 105 and the shaft 95 with the bevel gear 94. The movement is further transmitted from the tooth gear 105 via the tooth gear 106 to the lead screw 52 connected to the carriage and from the tooth gear 94 to the tooth gear 93 and to the screw 80 connected thereto, the nut 79 engaging this screw being fixed in the sleeve 45 carrying the tool head 46 along with the grinding wheel 48. As a result, the carriage 3 along with the sleeve 45 are mooved towards the left while the sleeve 45 is lowered to the extent equal to the amount of wear of the grinding wheel 48 at the preceding grinding operation. In this manner the compensating movements of the carriage 3 and the tool head 46 are accomplished.

After the roller 102 has passed the projection of the cam 103, the cheek 99 with the pawl 98 are returned into the original position under the action of the spring 104.

Thereafter the roller commences its movement along that portion of the groove of the cam 59 which is inclined with respect to rotational axis. The carrier is shifted towards the left also moving the bearing 55 of the lever 54. An end of the double-arm lever 54 engages the nut 53 moving the screw 52 along with the carriage 3 to the left. The cutting edge of the grinding wheel 48 comes into engagement with the dressing diamond 43.

In this manner the dressing operation is accomplished.

The limit switch 77 iperates when the roller 58 comes to the end of the inclined portion of the groove made in the cam 59, thereby switching out the clutch 63 and the motor 64 while switching on the motors 37 and 115 of the mechanism 36 for dressing the tool and that for driving the stop 114 respectively. At this moment the rotation is transmitted to the screw 40 from the motor 37 through the reducer 38, and the sleeve 42 along with the dressing diamond 43 is lowering. At the same time the rotation from the motor 115 is transmitted to the screw 117 through the reducer 116. The nut 118 with the stop 114 move to the right. The end of the stop 114 leaves the recess 119 provided in the body of the tooth gear 111, thereby releasing it. At the end of the downward movement of the sleeve 42 it actuates the limit switch 44 which disconnects the motors 37 and 115 with simultaneous switching on the electric motor 62 and the electromagnetic clutch 76.

These give rise to rotation of the tooth gear 75 and the gear 74 being in mesh therewith, thereby activating the shaft 73. The tooth gear 72 mounted on the shaft 73 engages the tooth gear 71 and rotates it. The rotation is further transmitted to the shaft 70 with the tooth gear 69 through the tooth gear 71, the gear 69 engaging the tooth gear 68. The latter rotates the shaft 67 carrying the cam 66. The groove of this cam 66 like that of the cam 59 is provided with alternating portions normal and inclined with respect to the rotational axis thereof. At the initial period of the movement of the cam 66 the roller 65 inserted into the cam groove passes the first portion inclined with respect to the rotational axis which moves the end of the lever 54 to the right. At this moment the bearing 55 of the lever 54 does not move. The other end of the lever 54 engaging the nut 53 moves the screw 52 along with the carriage 3 to the left. The carriage is thus shifted to the zone of grinding the gear cutter head 31. At the same time the rotation is transmitted from the shaft 73 to the shat 108 splined thereto and carrying the tooth gear 107. The movement is further transmitted to the crank 112 mounted on the tooth gear 111 and to the connecting rod 113 through the booth gear 109, the shaft 110 and the tooth gear 111. The connecting rod 113 being pivotally mounted on the sleeve 45 begins to rotate it in a horizontal plane. The sleeve 45 executes rotational reversible movements along with the tool head 46. After the carriage 3 has been moved into the zone of grinding the gear cutter head 31 up to the position where the cutting edge of the grinding wheel 48 is disposed over the surface of the tool of the gear cutter head 31 to be ground, the roller 65 is shifted to that groove portion which is normal to the rotational axis of the cam 66. The leftward movement of the carriage 3 is ceased while the shaft 67 splined to the shaft 84 transmits the movement to the master cams 82 and the 83. At the beginning of the grinding cycle the roller 81 attached to the end of the screw 80 comprising the support for the sleeve 45 rests upon the master cam 82 adapted to control the cycle of course grinding of the gear cutter head 31. The sleeve 45 moves down along with the tool head 46 removing a layer of metal from the tool surface of the cutter head 31. This movement is continued until the roller 81 reaches that point on the surface of the master cam which has the minimal distance from the rotational axis thereof. During this time the roller 65 engaging the groove of the cam 66 passes the portion of the groove which is normal to the rotational axis of the cam 66. Thereafter the master cam 82 begins to shift the sleeve 45 up breaking the contact between the cutting edge of the grinding wheel 48 and the surface being worked while the roller 65 enters the second portion of the groove inclined with respect to the rotational axis of the cam 66. The end of the lever 54 moves to the left shifting the carriage 3 until the grinding wheel 48 leaves the working zone. At the end of this stroke the carriage 3 acts on the limit switch 78 which activates the dividing mechanism 33.

As this takes place, the gear cutter head 31 is rotated through the angle pitch equal to the angular distance between the tool of the cutter head. The same sequence of operations is performed for the course grinding of all the tools of the gear cutter head 31.

After completing the grinding operation of the last tool an electric counter provided in the control system of the grinder and set to the number of tools in the gear cutter head 31 operates, thereby switching off the electric motors 37 and 115. The sleeve 42 along with the diamond 43 are moved up while the end of the stop 114 enters the recess 119 provided in the tooth gear 111, thereby fixing it in the position where the cutting edge of the grinding wheel 48 is in parallel with the direction of the movement of the carriage 3 and is in a line with the point of diamond 43.

At the extreme upper position of the sleeve 42 the limit switch 44 switches off the electric motors 37 and 115 as well as the electromagnetic clutch 76 while switching on the electric motor 62 and the electromagnetic clutch 63. The rotation is transmitted from the motor 62 through the reducer 61 to the shaft 60 carrying the cam 59. The roller 58 located in the groove of the cam 59 moves along the inclined portion of the groove, therefore the carrier 56 shifts the bearing 55 of the lever 54 to the right, thereby returning the carriage 3 to the initial position. At the end of the movement of the roller along the inclined portion of the cam groove the limit switch 77 operates, said switch disconnects the electric motor 62 and the electromagnetic clutch 63. Then by hand through the handle 92 connected to the tooth gear 91 the tooth gear 87 is brought into motion through the tooth gears 90 and 88 connected to the shaft 89. The tooth gear 87 comes into engagement with the rack 86 rigidly fixed on the body 85 of the master cams 82 and 83. Thus the master cam 83 specifying the operation conditions for subsequent fine gridning is positioned under the roller 81. Then the complete cycle of the operations is repeated for the fine grinding with the same sequence as in the case of the course grinding of the tools of the gear cutter head 31.

What is claimed is:

1. A gear cutter head grinder comprising: a bed having longitudinal and cross guideways formed thereon; a carriage mounted on the longitudinal guideways of said bed; a support mounted on the cross guideways of said bed; driving means for moving said carriage on said bed; a tool head mounted on said carriage; a work head mounted on said support; tool dressing means mounted on said bed between said support and said carriage; means for shifting said carriage into the grinding zone and connected to said driving means; means for shifting the carriage during tool dressing; a double-arm lever for connecting said means for shifting the carriage during tool dressing to said means for shifting the carriage into the grinding zone; means for reversible rotational movement of the tool head and connected to said means for shifting the carriage into the grinding zone; means for vertically shifting the tool head and connected to said means for shifting the carriage into the grinding zone; means for compensating movement of the carriage and connected to said means for movement of the carriage during tool dressing; means for vertical compensating movement of the tool head and connected to said means for vertical movement of the tool head during grinding, said means for compensating movement of the carriage being in direct communication with said double-arm lever, said lever having a movable bearing member; cam means connecting the bearing member of said double-arm lever to said carriage driving means, said means for compensating movement of the carriage being connected to said means for vertical compensating movement of the tool head for providing a predetermined time relationship between said compensating movements.

2. A gear cutter head grinder according to claim 1, wherein said cam means comprises a shaft with a cam rigidly fixed thereto, a groove in a sidewall of said cam for accommodating one end of the carriage, the other end of the carriage comprising said bearing member of said double-arm lever.

3. A gear cutter head grinder according to claim 2, including a second cam rigidly fixed to said shaft of said cam means, said second cam engaging said means for vertical compensating movement of the tool head.

4. A gear cutter head grinder according to claim 1, wherein the connection between said means for compensating movements of the tool head and of the carriage comprises two engaging gears.

5. A gear cutter head grinder according to claim 2, wherein the connection between said means for compensating movements of the tool head and of the carriage comprises two engaging gears.

* * * * *